United States Patent [19]

Tanaka

[11] Patent Number: 4,831,643

[45] Date of Patent: May 16, 1989

[54] DENTAL X-RAY FILM BACK

[75] Inventor: Hiroyuki Tanaka, Yokohama, Japan

[73] Assignee: Nix Company Ltd., Tokyo, Japan

[21] Appl. No.: 58,940

[22] Filed: Jun. 5, 1987

[30] Foreign Application Priority Data

Jun. 17, 1986 [JP] Japan ............................ 61-91392[U]

[51] Int. Cl.$^4$ ................................................ G03B 17/26

[52] U.S. Cl. ...................................... 378/169; 378/168

[58] Field of Search ......................... 378/168, 169, 184

[56] References Cited

U.S. PATENT DOCUMENTS 1,536,341 7/1920 Hodgson ............................ 378/169

2,112,816 3/1938 Rulon .................................. 378/169

2,127,365 8/1938 McHugh ............................ 378/169

3,551,673 12/1970 Siegel ................................ 378/168

*Primary Examiner*—Janice A. Howell

*Assistant Examiner*—Joseph A. Hynds

*Attorney, Agent, or Firm*—Wegner & Bretschneider

[57] ABSTRACT

A dental X-ray film pack includes a dental X-ray film, an inner packaging member covering both sides of the dental X-ray film and an outer packaging member having a peeling piece at a part thereof and enclosing the dental X-ray film and inner packaging member. The dental X-ray film pack is provided with a means for uniting together a section of the inner packaging member, said section covering one side of the dental X-ray film on the side of the peeling piece, and the peeling piece.

6 Claims, 6 Drawing Sheets

DENTAL X-RAY FILM BACK

BACKGROUND OF THE INVENTION (1) Field of the Invention

This invention relates to a dental X-ray film pack useful in X-ray photography upon dental diagnosis and/or treatment.

(2) Description of the Prior Art

X-ray pictures of teeth are usually taken in bright examination and treatment rooms. A dental X-ray film (hereinafter simply called "film") is therefore enclosed in a light-tight outer packaging member so that a dental X-ray film pack is formed. It is inserted to a desired position within a mouth, followed by irradiation of X-rays. After completion of exposure to X-rays, the dental X-ray film pack is taken out of the mouth. In a dark room or box, the outer packaging member is peeled and the film is taken out and is then subjected to development, fixing and water-washing treatments to obtain an X-ray image of teeth on the film. There are a variety of types among such dental X-ray film packs. The construction of one example of dental X-ray film packs will next be described with reference to FIGS. 1 through 3 of the accompanying drawings.

FIG. 1 is a top plan view of a conventional dental X-ray film pack. FIG. 2 is a cross-sectional view taken along line II—II of FIG. 1. FIG. 3 is another cross-sectional view taken along line III—III of FIG. 1. In each of the drawings, there are shown a film 1 and a light-tight opaque sheet 2 covering both sides of the film 1. As the light-tight sheet 2, an elongated black paper sheet having the same width as the film 1 may be used by way of example. The light-tight sheet 2 is folded back at folded-back portions *2a,2b* and the folded-back end portion forms an overlapping portion *2c*. As a result, both sides of the film 1 is shielded from light. Designated at numeral 3 is a reflective sheet interposed between the light-tight sheet 2 and the folded-back overlapping portion *2c* of the light-tight sheet 2. The reflective sheet 3 is made, for example, of a thin metal foil such as lead foil. The light-tight sheet 2 and reflective sheet 3, in combination, form an inner packaging member.

Numeral 4 indicates an outer packaging member, within which the film 1, light-tight sheet 2 and reflective sheet 3 are enclosed. As the outer packaging member 4, may be used by way of example an elongated opaque sheet made of a synthetic resin, e.g., polyvinyl chloride, and having a width slightly broader than the width of the film 1. There are also shown folded-back portions *4a,4b* of the outer packaging member 4, a folded-back section *4c* extending further from the folded-back portion *4b*, and a peeling tab *4d* formed at a free end portion of the folded-back section *4c*. The folded-back section *4c* and peeling tab *4d*, in combination, form a peeling piece. Along both sides *4e,4f* of the outer packaging member 4, the upper and lower sheet sections of the outer packaging member 4 are heat-sealed as shown in FIG. 3. Numeral 5 indicates a weak adhesive layer adhering the folded-back section *4c* and the underlying upper sheet section of the outer packaging member 4 by a weak adhesive force, whereby tee film 1 is enclosed light-tight within the outer packaging member 4. It should be noted that the thickness of each element of structure is shown on an extremely enlarged scale in FIGS. 2 and 3 and the overall thickness of the dental X-ray film pack is slightly greater than 1 mm as a matter of fact.

Upon taking an X-ray picture, the above dental X-ray film pack is inserted and fixed in a mouth with the side opposite to the side, in which the peeling tab *4d* is formed, being maintained in contact with teeth as an object for the X-ray photography. X-rays are then irradiated through the teeth. The X-rays penetrate through the teeth and transmit through the outer packaging member 4 and light-tight sheet 2, so that the film 1 is exposed to the X-rays to form an X-ray image (latent image) of the teeth. Upon this X-ray photography, X-rays which may penetrate from the side of the peeling tab *4d* by reflection and the like are reflected back by the reflective sheet 3 so as to avoid penetration of unnecessary X-rays to the film.

After completion of photography in the above-described manner, the dental X-ray film pack is taken out of the mouth and the film 1 is removed from the dental X-ray film pack in a dark room or box, followed by its development and fixing treatments.

In order to take out the film 1 from the dental X-ray film pack in the dark room or box after completion of the X-ray photography, the peeling tab *4d* is first of all pulled in a direction indicated by an arrow 6 in FIG. 2 so as to peel off the tab *4d* from the weak adhesive layer 5 . When the peeling tab *4d* is pulled further in the direction of the arrow 6, the heat seal between the side edges *4e* and *4f* (the righthand side edge as viewed in FIG. 1) of the outer packaging member 4 is eventually separated. As a consequence, an opening is formed in the right of the outer packaging member 4. The reflective sheet 3, light-tight sheet 2 and film 1, which have been enclosed within the outer packaging member 4, are taken out through the opening and the reflective sheet 3 and light-tight sheet 2 are then removed to separate the film 1.

In the above-described procedure, it is however extremely irksome to remove the reflective sheet 3, light-tight sheet 2 and film 1 together from the outer packaging member 4 and then separate the film 1 alone from the reflective sheet 3 and light-tight sheet 2. This irksomeness is aggravated further, especially, when the above work is carried out by touch in a dark box.

BRIEF DESCRIPTION OF THE INVENTION

An object of this invention is to provide a dental X-ray film package which is free from the above-mentioned problems of the prior art and permits easy removal of a film.

In one aspect of this invention, there is thus provided a dental X-ray film pack including a dental X-ray film, an inner packaging member covering both sides of the dental X-ray film and an outer packaging member having a peeling piece at a part thereof and enclosing the dental X-ray film and inner packaging member therein. The dental X-ray film pack is provided with a means for uniting together a section of the inner packaging member, said section covering one side of the dental X-ray film on the side of the peeling piece, and the peeling piece.

When the peeling piece is lifted or pulled, parts of both side edges of the outer packaging member are torn off together with the peeling piece. As a result, the inner packaging member united with the peeling piece by the uniting means is partly or wholly pulled out together with the peeling piece so that the film is exposed. Owing to the unification of the peeling piece of the outer packaging member and the inner packaging member by the uniting means, the film can be easily taken out of the dental X-ray film pack without need for any cumbersome procedure.

BRIEF DESCRIPTION OF THE ACCOMPANYING DRAWINGS

The above and other objects, features and advantages of the present invention will become apparent from the following description of the invention and the appended claims, taken in conjunction with the accompanying drawings, in which:

Figure 4:
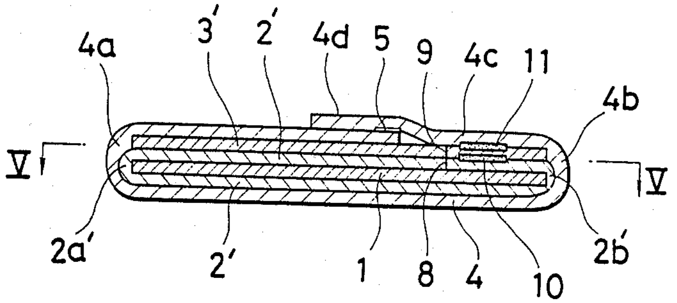
FIG. 4 is a longitudinal cross-sectional view of a dental X-ray film pack according to the first embodiment of this invention.
Figure 6A:
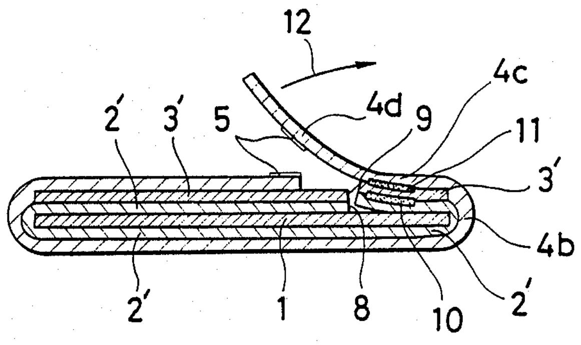
Figure 6B:
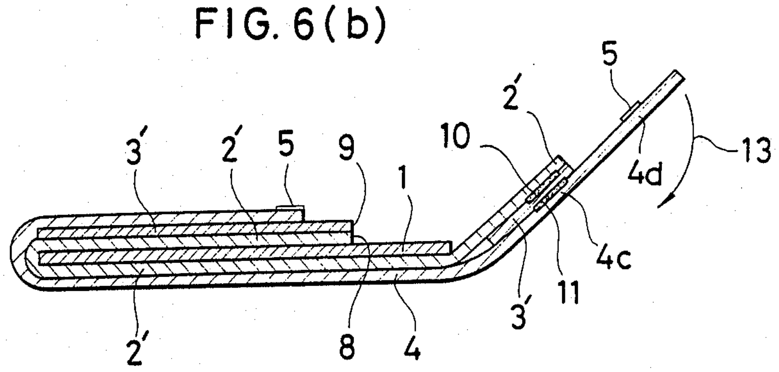
Figure 6C:
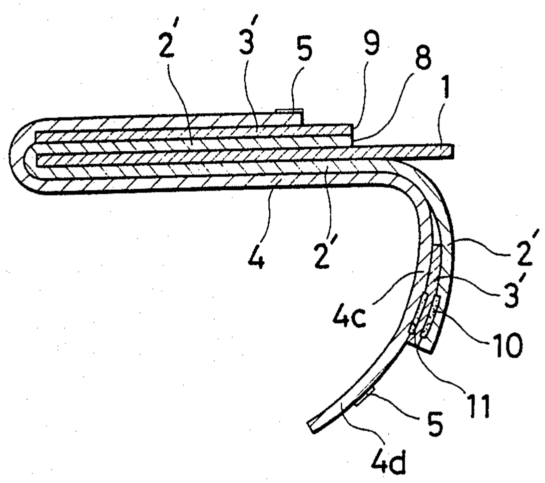
Figure 7:
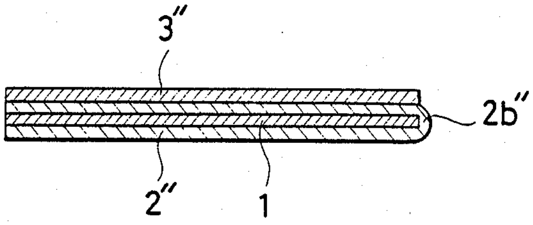
Figure 8:
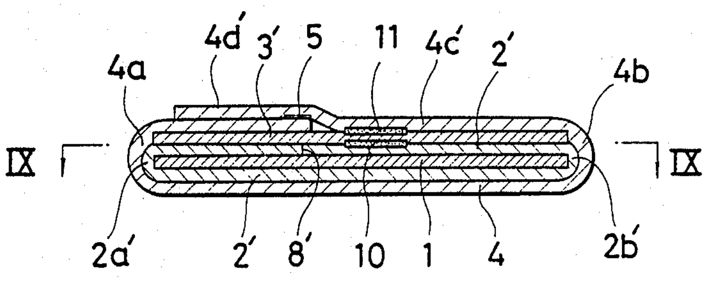
Figure 9:
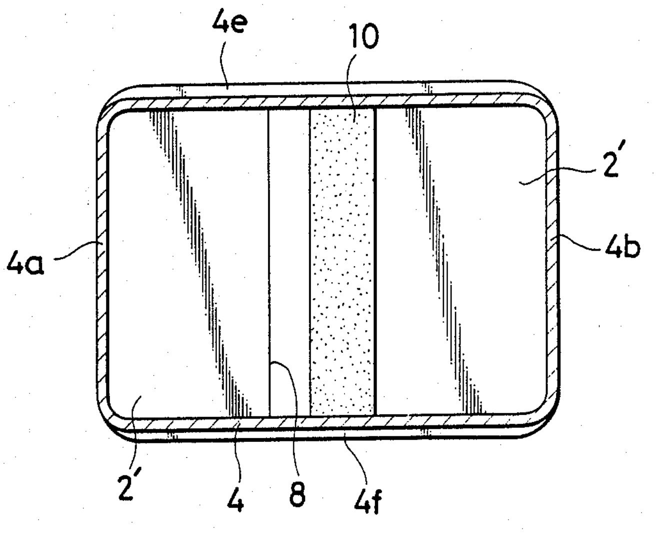
Figure 10A:
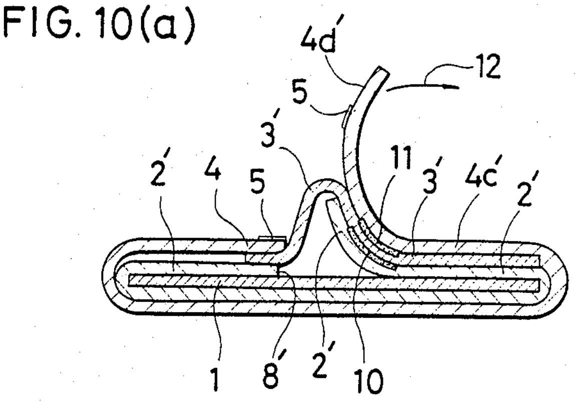
Figure 10B:
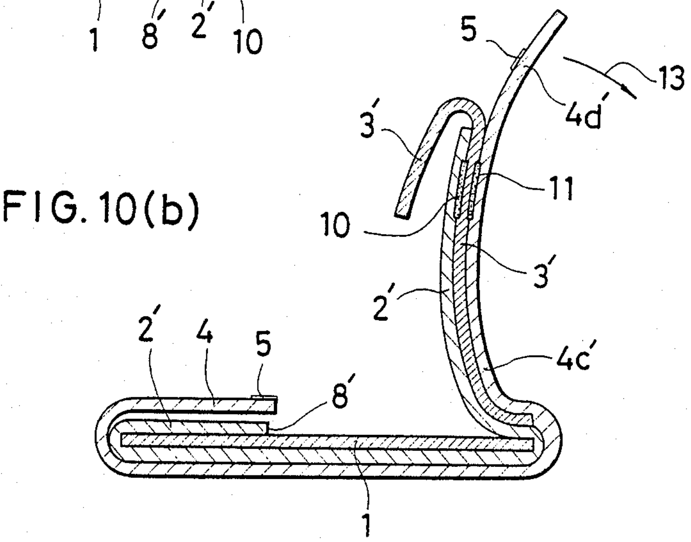
Figure 10C:
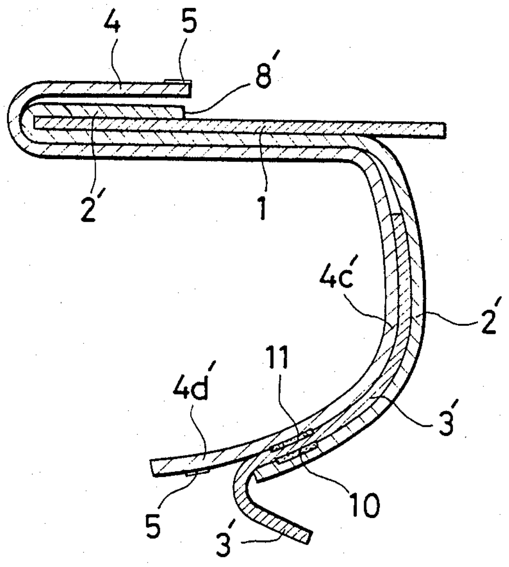
Figure 11:
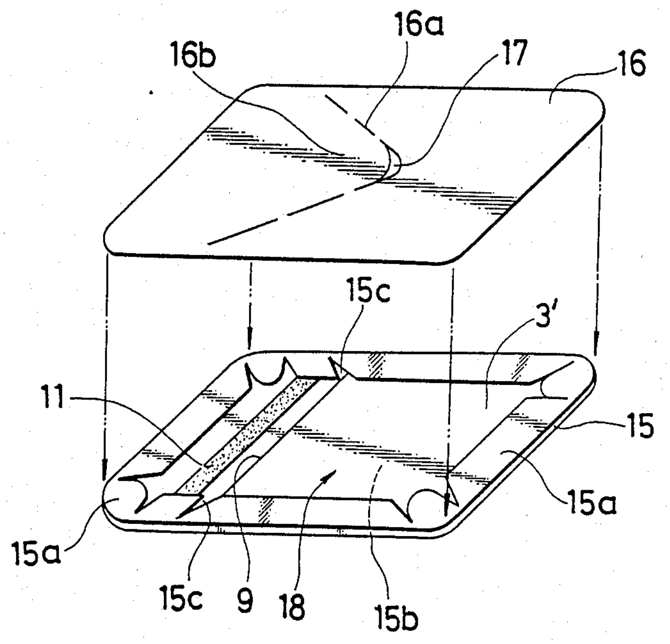

FIGS. 6(*a*), 6(*b*) and 6(*c*) are cross-sectional views showing the film-removing procedure from the dental X-ray film pack of FIG. 4;

FIG. 7 is a cross-sectional view showing specific examples of a light-tight sheet and a reflective sheet;

FIG. 8 is a longitudinal cross-sectional view of a dental X-ray film pack according to the second embodiment of this invention;

FIG. 9 is a cross-sectional view of the dental X-ray film pack taken along line IX—IX of FIG. 8;

FIGS. 10(*a*), 10(*b*) and 10(*c*) are cross-sectional views showing the film-removing procedure from the dental X-ray film pack of FIG. 8; and FIG. 11 is an exploded perspective view of a dental X-ray film pack according to the third embodiment of this invention.

DETAILED DESCRIPTION OF THE INVENTION AND PREFERRED EMBODIMENTS

Figure 1:
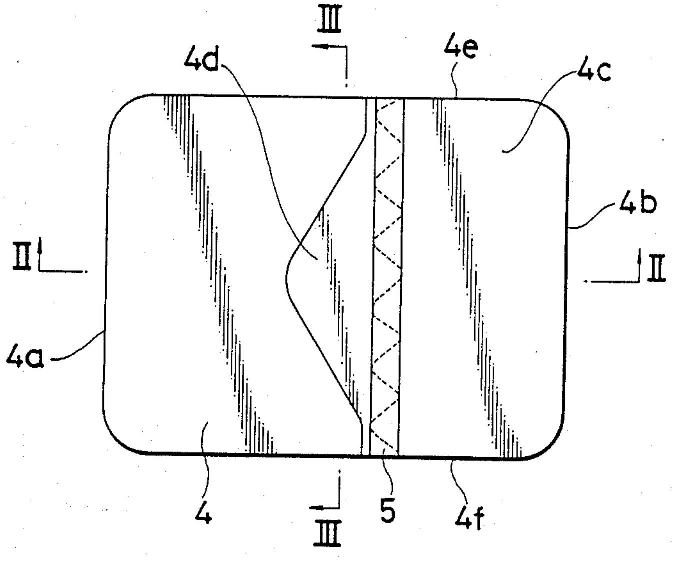
FIG. 1 PRIOR ART
FIG. 1 is a top plan view of a conventional X-ray film pack.
Figure 2:
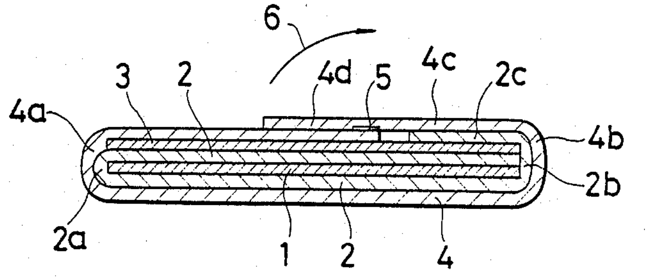
FIG. 2 PRIOR ART
FIG. 2 is a cross-sectional view of the conventional X-ray film pack taken along line II—II of FIG. 1.
Figure 3:
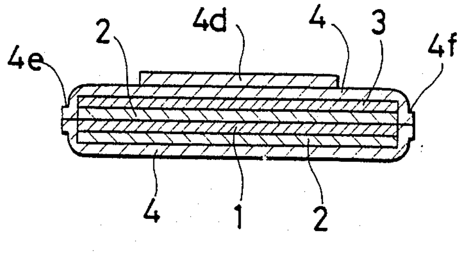
FIG. 3 PRIOR ART
FIG. 3 is a cross-sectional view of the conventional X-ray film pack taken along line III—III of FIG. 1.
Figure 5:
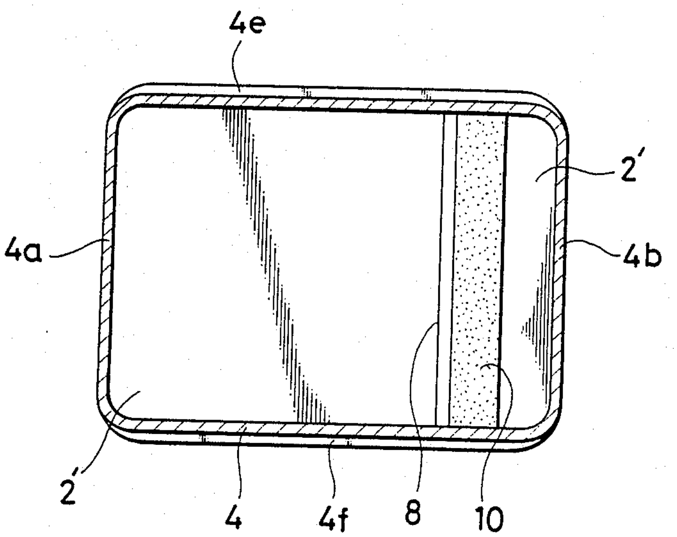
FIG. 5 is a cross-sectional view of the dental X-ray film pack taken along line V—V of FIG. 4.

The construction of the dental X-ray film pack according to the first embodiment of this invention will next be described with reference to FIGS. 4 and 5, in which elements of structure similar to those shown in FIG. 2 are identified by like reference numerals and their description are omitted herein. Numeral 2' indicates a light-tight sheet corresponding to the conventional light-tight sheet 2. Similar to the conventional light-tight sheet 2, an elongated black paper sheet of the same width as the film 1 is used as the light-tight sheet 2'. The light-tight sheet 2' is folded back at folded-back portions **2*a*', 2*b*'. The light-tight sheet 2' is however different from the conventional light-tight sheet 2 in that the overlapping portion 2*c* is not formed. Both ends of the elongated black paper sheet which forms the light-tight sheet 2' are brought into exact abutment at a position a predetermined distance away from the folded-back portion 2*b*'. Therefore, the upper section of the light-tight sheet 2' as viewed in the drawings is in the same form as an endless sheet is cut along a split 8 into two horizontal sections as shown in FIG. 5**.

Designated at numeral 3' is a reflective sheet corresponding to the conventional reflective sheet 3. The reflective sheet 3' is made of a material similar to that of the reflective sheet 3. Numeral 9 indicates another split along which the reflective sheet 3' is divided into two sections. The split 9 is formed substantially at the same location as the split 8 of the light-tight sheet 2'. Numeral 10 indicates an adhesive layer which bonds one of the thus-divided sections of the light-tight sheet 2' and one of the thus-divided sections of the reflective sheet 3', the latter one section being on the same side as the former one section, with an ordinary adhesive force. Further, designated at numeral 11 is another adhesive layer which bonds the reflective sheet 3' and the folded-back section **4*c* of the outer packaging member 4 with an ordinary adhesive force at a location substantially the same as the adhesive layer 10**.

The procedure required upon removal of the film 1 from the dental X-ray film pack of the first embodiment will next be described with reference to the cross-sectional views given in FIGS. 6(*a*) through 6(*c*), in which like elements of structure as those shown in FIG. 4 are identified by like reference numerals. After completion of X-ray photography, the removal of the film 1 is performed in a dark room or box. When the peeling tab **4*d* is first of all pulled in a direction indicated by an arrow 12 as depicted in FIG. 6**(*a*), the peeling tab **4*d* is peeled off from the underlying outer packaging member 4 at the position corresponding to the weak adhesive layer 5. When the peeling tab 4*d* is pulled further, the heat seals of both side edges 4*e*,4*f* of the outer packaging member 4 are torn and the folded-back section 4*c* is peeled off accordingly. At the same time, the section of the reflective sheet 3', which section is bonded to the folded-back section 4*c* by the adhesive layer 11, and the corresponding section of the light-tight sheet 2' bonded to the reflective sheet 3' by the adhesive layer 10** are also peeled off upwardly.

When the pulling of the peeling tab **4*d* is continued in the above manner, the folded-back section 4*c*, the above-mentioned section of the reflective sheet 3' and the corresponding section of the light-tight sheet 2' are completely peeled off from the upper section of the outer packaging member 4 as viewed in FIG. 4. When the peeling tab 4*d* is then pulled backward in a direction indicated by an arrow 13 from the above state, the lower section of the outer packaging member 4 the heat seal of which with the folded-back section 4*c* has already been torn off is turned down as depicted in FIG. 6**(*c*). As a result, the film 1 is solely caused to extend out from the outer packaging member 4 so that the film 1 can now be pulled out. The thus-pulled out film 1 is thereafter subjected to development and fixing treatments in the dark room or box to provide an X-ray picture of teeth.

Needless to say, the adhesive layer 10 is unnecessary and the formation of the splits 8,9 is only required where the light-tight sheet 2' and reflective sheet 3' are provided in the form of a unitary member at the beginning. Furthermore, the light-tight feature can be enhanced further by offsetting the locations of the splits 8,9 suitably.

Referring next to FIG. 7, other specific examples of the light-tight sheet and reflective sheet useful in the above-described first embodiment of this invention will be described. Numeral 2" indicates a light-tight sheet of this specific example while numeral **2*b*" indicates a folded-back portion thereof. Designated at numeral 3" is a reflective sheet of this specific example. Incidentally, numeral 1 indicates a film of the same type as the film 1 depicted respectively in the above-described drawings. The light-tight sheet 2"** is folded back at the folded-back portion 2b″. The resultant upper and lower sections of the light-tight sheet 2″ cover both sides of the film 1 completely. Both side edges of the light-tight sheet 2″ are in flush relative to the corresponding side edges of the film 1. The reflective sheet 3″ is united with the upper section of the thus-folded light-tight sheet 2″. This united structure can be provided in the following manner by way of example. A synthetic resin film is laminated on the upper section of the light-tight sheet 2″. Another synthetic resin film is laminated on one side of the reflective sheet 3″, which one side is to be brought into contiguous relation with the upper section of the light-tight sheet 2″. Both laminated films are then heat-sealed to each other. When the united structure of the light-tight sheet 2″ and reflective sheet 3″ is applied to the above-described first embodiment of this invention, the adhesive layer 10 is unnecessary and the splits 8,9 and adhesive layer 11 are only required.

Such a united structure of the light-tight sheet 2″ and reflective sheet 3″ can facilitate the production and handling of a dental X-ray film pack further.

In the first embodiment of this invention, the weak adhesive layer 5 is used to adhere the folded-back section 4c with the underlying upper section of the outer packaging member 4. When the outer packaging member 4 is made of a thermoplastic synthetic resin, the folded-back section 4c and the underlying upper section of the outer packaging member 4 can be heat-sealed by applying mild heat to a desired part. The weak adhesive layer 5 can hence be omitted.

In the first embodiment of this invention, the film 1 can be exposed out from the outer packaging member 4 by simply pulling the peeling tab 4d as described above. Unlike conventional dental X-ray film packs, the film 1 alone can be taken out easily without need for any cumbersome procedure.

The construction of the dental X-ray film pack according to the second embodiment of this invention will next be described with reference to FIGS. 8 and 9, in which elements of structure similar to those shown in FIGS. 4 and 5 are identified by like reference numerals and their description are omitted herein. Numerals 4c′,4d′ indicate respectively a folded-back section and peeling tab, which correspond to the folded-back section 4c and peeling tab 4d illustrated in FIG. 4. The folded-back section 4c′ is different from the folded-back section 4c of the first embodiment in that the length of the former folded-back section is longer than that of the latter folded-back section. Accordingly, the position of the peeling tab 4d′ is naturally closer to the folded-back portion 4a of the outer packaging member 4. For this reason, the peeling piece composed of tee folded-back section 4c′ and peeling tab 4d′ is larger than that of the first embodiment. Numeral 8′ indicates a split corresponding to the split 8 shown in FIG. 4. The split 8′ is formed in the light-tight sheet 2′ at a location rather closer to the folded-back portion 4a of the outer packaging member 4. Different from the preceding first embodiment, no split is formed in the reflective sheet 3′ in the second embodiment of this invention.

The procedure required upon removal of the film from the dental X-ray film pack of the second embodiment will next be described with reference to the cross-sectional views given in FIGS. 10(a) through 10(c), in which like elements of structure as those shown in FIG. 8 are identified by like reference numerals. When the peeling tab 4d′ is pulled in a dark room or box in a direction indicated by an arrow 12 as illustrated in FIG. 10(a), the peeling tab 4d′ is separated from the underlying upper section of the outer packaging member 4 at the location corresponding to the weak adhesive layer 5. When the peeling tab 4d′ is pulled further, the heat seals of both side edges 4e,4f of the outer packaging member 4 are torn so that the folded-back section 4c′ is peeled off accordingly. At the same time, the section of the reflective sheet 3′ which section is bonded to the folded-back section 4c′ by the adhesive layer 11 is partly pulled off the outer packaging member 4 and the corresponding section of the light-tight sheet 2′ bonded to the reflective sheet 3′ by the adhesive layer 10 is also peeled off upwardly.

When the pulling of the peeling tab 4d′ is continued in the above manner, the folded-back section 4c′, the entire part of the reflective sheet 3′ and a part of the reflective sheet 3′ are completely peeled off from the upper section of the outer packaging member 4 as viewed in FIG. 8. When the peeling tab 4d′ is then pulled down in a direction indicated by the arrow 13 from the above state, the lower section of the outer packaging member 4 the heat seal of which with the folded-back section 4c′ has already been torn off is turned down as depicted in FIG. 10(c). As a result, the film 1 is solely caused to extend out from the outer packaging member 4 so that the film 1 can now be pulled out.

Incidentally, the adhesive layer 10 is obviously unnecessary and the split 8′ is not required either where the light-tight sheet 2′ and reflective sheet 3′ are in the form of a unitary member as shown in FIG. 7. In this case, the upper section of the light-tight sheet 2′, which section is on the side of the peeling piece, and reflective sheet 3′ are pulled out together.

In the second embodiment of this invention, it is also possible to take out the film 1 alone easily by simply pulling the peeling tab 4d′ without need for any cumbersome procedure as described above.

The dental X-ray film pack according to the third embodiment of this invention is shown as the exploded perspective view in FIG. 11, in which numeral 15 indicates a film support made of a somewhat thick paper sheet Edge portions and corner portions are folded inwardly to form inwardly-folded edge portions 15a. Synthetic resin films are laminated on the surfaces of an outer side 15b of the film support 15 and the respective inwardly-folded edge portions 15a. Designated at numeral 15c are notches formed in the respective inwardly-folded edge portions 15a. Numeral 16 indicates a packaging sheet which has been formed by laminating synthetic resin films on both sides of a paper sheet. A tear portion is formed by a tear line 16a as shown in FIG. 11, so that a peeling tab 16b is formed. A peeling piece is formed by the peeling tab 16b and the section extending in continuation with the peeling tab 16b. Numeral 17 indicates a finger hole which facilitates the peeling of the peeling tab 16b. An outer packaging member is formed by the film support 15 and packaging sheet 16.

Designated at numeral 18 is a unit of a film, a light-tight sheet covering both sides of the film and a reflective sheet. The construction of these film, light-tight sheet and reflective sheet may be identical to the construction of either the first embodiment or the second embodiment. The unit 18 depicted in FIG. 11 is identical to that illustrated in FIG. 4 and the reflective sheet 3′, split 9 and adhesive layer 11 are visible on the top surface. The unit 18 of such a construction is held in place under the respective inwardly-folded edge portions 15*a* of the film support 15. By superposing the film support 15 and packaging sheet 16 as shown by two-dot chain lines and then heating them together, the laminated synthetic resin films are heat-sealed to each other and at the same time the peeling tab 16*b* is bonded to the unit 18 by the adhesive layer 11, whereby the packaging sheet 16, film support 15 and unit 18 are united together into the dental X-ray film pack of the third embodiment.

In order to take out the film from the dental X-ray film pack of the third embodiment, the peeling tab 16*b* is lifted first of all. The front and rear edge portions 15*a*, as viewed in FIG. 11, are then torn from their respective notches 15*c*. The peeling tab 16*b*, its continuous section of the packaging sheet 16, the left-hand edge portion 15*a*, the split reflective sheet 3' and the split light-tight sheet 2' are torn together eventually. Their peeling is thereafter effected in the same manner as in the first embodiment so that the film 1 alone is exposed. It is hence possible to take out the film 1 easily by simply pulling the peeling tab 16*b*.

It is readily appreciated that the positions of the adhesive layers, splits and peeling tab can be suitably chosen in the third embodiment as in the preceding embodiments, in accordance with the structure of the light-tight sheet and reflective sheet employed therein. It is also understood that the third embodiment may be modified to pull out a part of the inner packaging member from the outer packaging member as in the preceding second embodiment. Similar to the preceding embodiments, the third embodiment has an advantageous effect that the film 1 alone can be easily taken out by simply pulling the peeling tab 16*b*.

In each of the above-described embodiments, the inner packaging member is composed of the light-tight sheet and reflective sheet by way of example. In addition to its primary light-tight function, the light-tight sheet also has a function as a protective member for avoiding physical and chemical damages of the film by its handling in the course of its production process or by its contact with the outer packaging member. The light-tight sheet is indispensable for a dental X-ray film pack of the above-described sort. On the other hand, the reflective sheet is provided merely to prevent scattered X-rays, which may penetrate through the back of the dental X-ray film pack upon X-ray photography, from giving no substantial influence to an X-ray image to be formed. No substantial problems would therefore arise practically when the reflective sheet is omitted. In the above-described embodiments, it may be possible to form the inner packaging member with the light-tight sheet only. In such a case, the location of the adhesive layer and the presence or absence of the split can be readily determined from the above description of the respective embodiments.

Further, the peeling piece is provided on the side of the reflective sheet in each of the above-described embodiment. Such a construction has been adopted, because the light tightness of the outer packaging member may not be perfect in some instances on the side where the peeling piece is formed and the peeling piece is hence arranged on the side where the light is shielded doubly by the light-tight sheet and reflective sheet. However, the shielding of light can be achieved fully by the light-tight sheet and outer packaging member. Perfect light shielding can be achieved especially when a synthetic resin sheet is used as the outer packaging member. Therefore, it is not absolutely necessary to form the peeling piece on the side of the reflective sheet. The peeling piece may be formed on the opposite side. Even in such a case, the present invention can still be applied in the same manner as in the aforementioned case where the inner packaging member is formed by the light-tight sheet only.

The peeling of the peeling piece and the subsequent removal of the film are carried out manually in general. According to the present invention, the film alone is exposed by peeling the peeling piece. It is accordingly feasible to perform the peeling and film-removing work by a machine.

Having now fully described the invention, it will be apparent to one of ordinary skill in the art that many changes and modifications can be made thereto without departing from the spirit or scope of the invention as set forth herein.

I claim:

1. A dental x-ray film pack comprising:

(a) a dental x-ray film;

(b) an inner packaging member covering both sides of the dental x-ray film wherein said inner packaging member comprises a first light-tight sheet covering one side of the dental x-ray film and a second light-tight sheet and a reflective sheet covering in combination the other side of the dental x-ray film;

(c) an outer packaging member comprising a peeling piece at a part thereof and completely enclosing the dental x-ray film and inner packaging member therein, and a first uniting means located between a section of the inner packaging member, said section covering one side of the dental x-ray film on the side of the peeling piece, and the peeling piece, for uniting together said section of the inner packaging member and said peeling piece; and (d) said second light-tight sheet and reflective sheet are united together at parts thereof by a second uniting means and at least one of the second light-tight sheet and reflective sheet is united with the peeling piece by the first uniting means.

2. The dental X-ray film pack as claimed in claim 1, wherein the first and second light-tight sheets covering both sides of the dental X-ray film respectively are formed as an integral member.

3. The dental X-ray film pack as claimed in claim 1, wherein the section of the inner packaging member, said section covering one side of the dental X-ray film on the side of the peeling piece, is split at a prescribed location along said one side.

4. The dental X-ray film pack as claimed in claim 3, wherein the first uniting means is a first adhesive.

5. The dental X-ray film pack as claimed in claim 4, wherein the peeling piece is united to the section of the inner packaging member, said section covering one side of the dental X-ray film on the side of the peeling piece, with a second adhesive, the adhesive force of which is weaker than that of the first adhesive.

6. A dental x-ray film pack comprising:

(a) a dental x-ray film:

(b) an inner packaging member covering both sides of the dental x-ray film wherein said inner packaging member comprises a first light-tight sheet covering one side of the dental x-ray film and a second light-tight sheet and a reflective sheet formed as a unitary member governing in combination the other side of the dental x-ray film;

(c) an outer packaging member comprising a peeling piece at a part thereof and completely enclosing the dental x-ray film and inner packaging member therein, and a first uniting means located between a section of the inner packaging member, said section covering one side of the dental x-ray film on the side of the peeling piece, and the peeling piece, for uniting together said section of the inner packaging member and said peeling piece.

* * * * *